Oct. 13, 1964    R. R. GREENE    3,153,132

INDUCTION HEATING APPARATUS

Filed Sept. 8, 1960    4 Sheets-Sheet 1

INVENTOR.
ROBERT R. GREENE
BY
Strauch, Nolan + Neale
ATTORNEYS

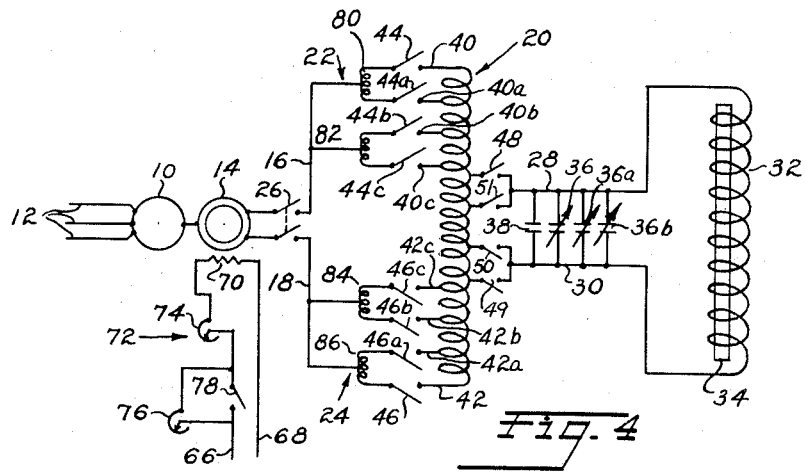

Oct. 13, 1964  R. R. GREENE  3,153,132
INDUCTION HEATING APPARATUS
Filed Sept. 8, 1960  4 Sheets-Sheet 3
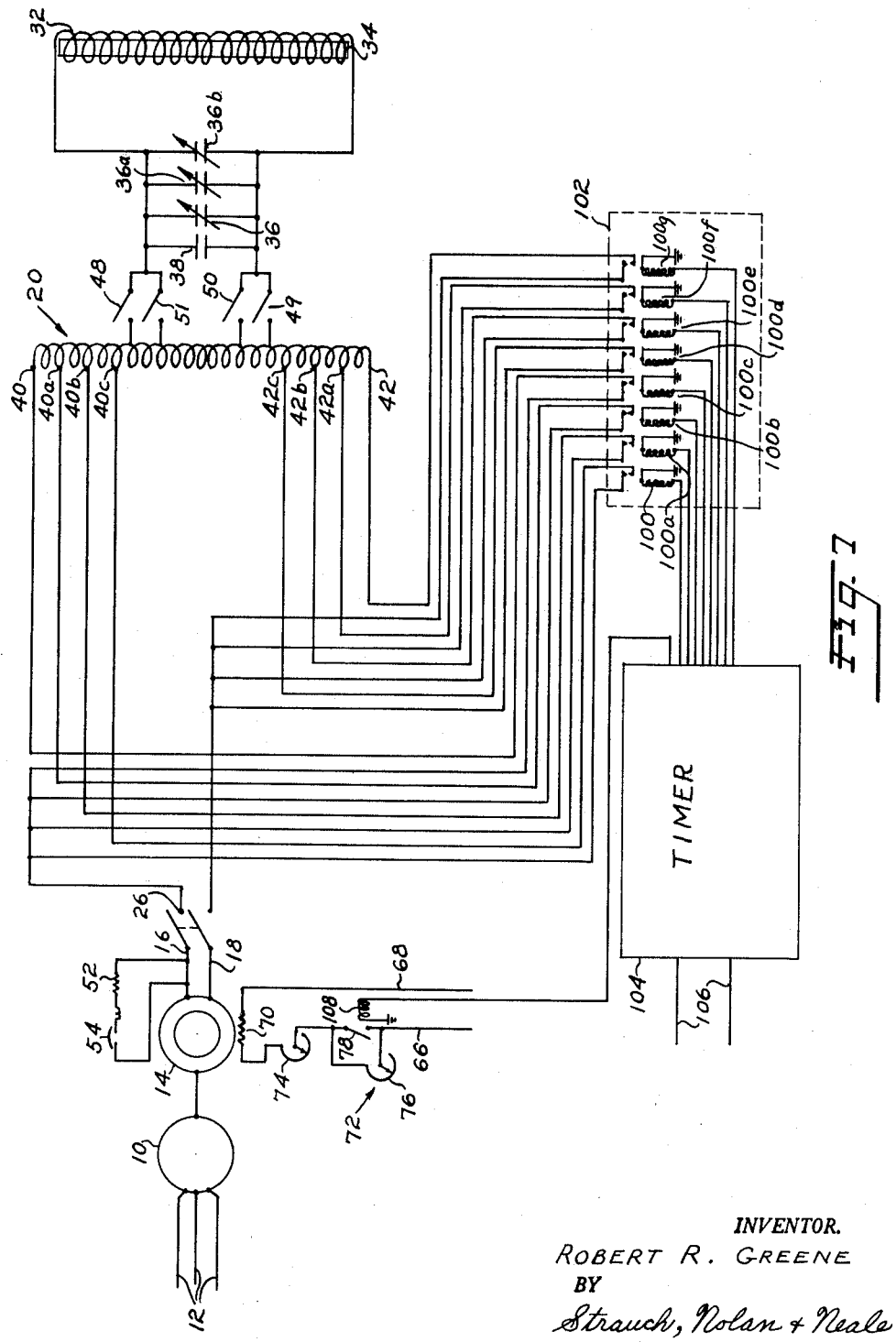
INVENTOR.
ROBERT R. GREENE
BY
Strauch, Nolan + Neale
ATTORNEYS

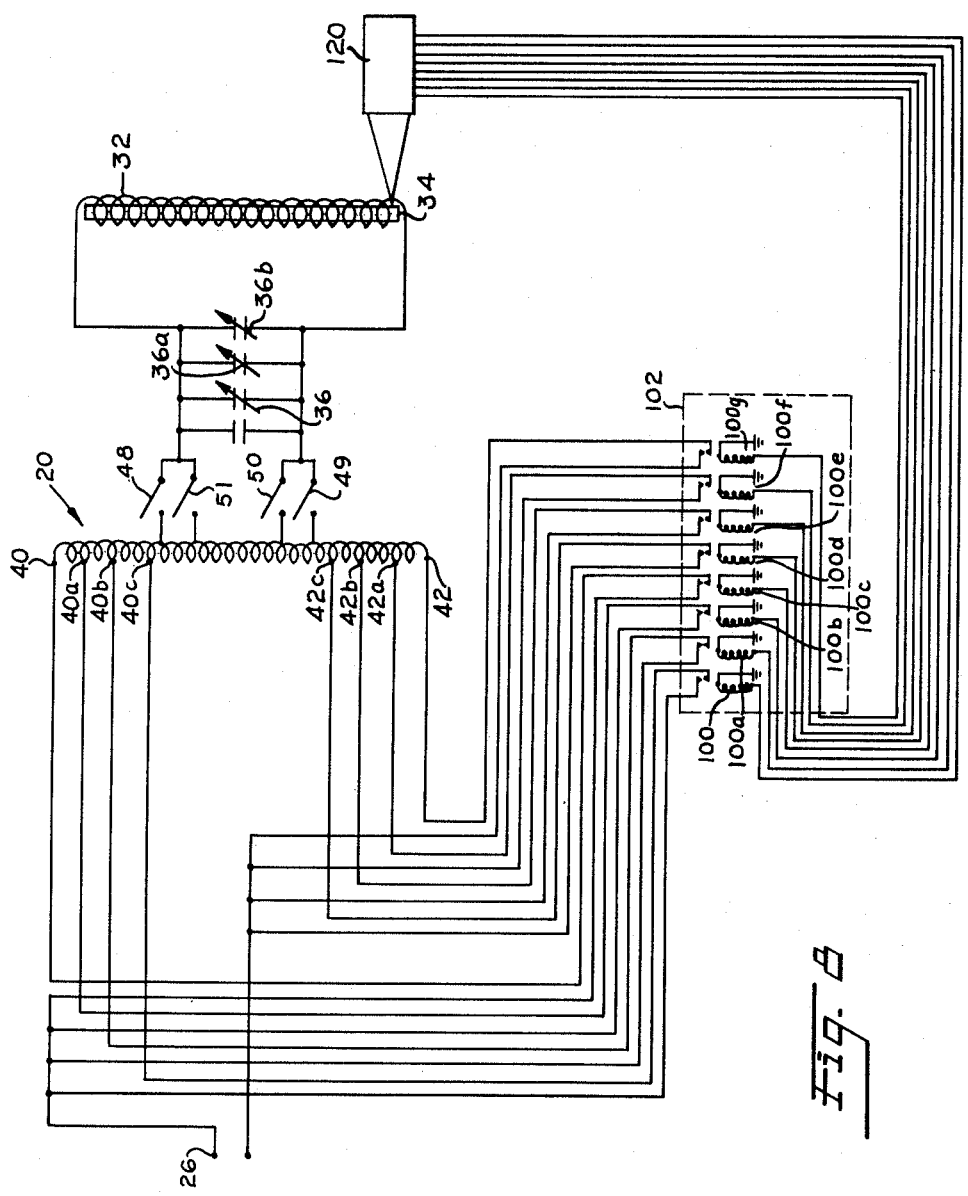

3,153,132
INDUCTION HEATING APPARATUS
Robert R. Greene, New Castle, Pa., assignor to Rockwell-Standard Corporation, Coraopolis, Pa., a corporation of Pennsylvania
Filed Sept. 8, 1960, Ser. No. 54,782
4 Claims. (Cl. 219—10.75)

The present invention relates to improvements in methods and apparatus for heating work pieces the electrical characteristics of which vary with the temperature thereof and more particularly to improved induction heating apparatus and methods by which the work piece power absorption rate can be maintained substantially constant without work piece power input interruption despite variations in the electrical characteristics of the work piece during the heating cycle.

In induction heating apparatus of the kind referred to herein for the heating of metal blanks or articles as a preliminary for a subsequent work operation or as heat treatment, it has become a more or less general practice to vary either the frequency or the voltage of the induced current in order to achieve the desired heating effect. Redmond et al., United States Patent 2,689,900, dated September 21, 1954, for Circuit for Heat Treating Metallic Objects is illustrative of the former, and Mittelmann, United States Patent 2,441,435, dated May 11, 1948, for Rematching Relay Control System is illustrative of the latter. In metal parts to be induction heat treated it is often desirable that different portions of the part to be heated by currents of different frequencies or voltage because of either the irregular shape of the metal part or the desired heat penetration in certain portions of the part as in a hardening operation or for hot working the metal. The time duration of each heating period is, of course, another important factor in determining the temperature and heat penetration in the work piece.

In general, currents of higher frequencies are applied for surface work hardening and currents of a lower frequency for deeper heat penetration subject, of course, again to the time duration of the heating cycle and the diameter of the material. As a basic rule the heating effect is proportional to the square value of the induced current and inversely proportional to the cross sectional area of the current path.

Another important factor to be considered in the design of induction heating apparatus is to provide in some instances, means for gradually varying the temperature gradient of the heat induced into the work piece along certain portions of the work piece, which is especially important if the so-heated work piece is subjected to a subsequent hot working operation where it may be desired to increase or decrease the temperature in certain portions of the work piece depending on the amount of hot working to be done. This gradient heating is desirable to prevent grain growth in areas of little hot working and can be accomplished by special design of the induction heating coils in the unit.

In induction heating magnetic metal parts to or beyond the point at which they lose their magnetic property (usually referred to as the Curie temperature), it is necessary to supply additional power to the induction heater circuit to compensate for the changes in the electrical and metallurgical properties of the article being heated as it approaches and passes through the Curie temperature. This phenomenon is described in detail in United States Patent 2,324,525 to E. M. Helmann for Method of and Apparatus for Heat Treating Metal. This necessary power input increase has been obtained, prior to the present invention, only by at least momentary interruption of power input to the induction heater circuit by disconnecting the power source, opening the main contactor to bleed the tank circuit, and thereafter switching the transformer tap connections. Due to the time loss inherent in the prior conventional methods and apparatus, this switching is usually done, as in said Mittelmann patents, but once during the heating cycle and preferably at or just beyond the point at which the work piece reaches the Curie temperature. This practice necessarily results in a considerable time delay during the heating process. While this time delay may be but from a fraction of a second to several seconds, such a delay is undesirable in modern production practices and results in a lack of assurance that similar work pieces during any one production run will be uniformly heated.

In addition to the above undesirable factors it is also known that, in induction heating units, the impedance of the inductor circuit increases as the heat in the work piece increases resulting in a gradual decrease of power in the circuit at any fixed voltage. As a result of this power input reduction, the power absorption by the work piece usually reaches its lowest point at or near the Curie temperature of the work piece. This is very undesirable effect in induction heating magnetic materials from both the economic and metallurgical view points. Decrease in power absorption may also be caused by heat conduction and radiation losses due to the shape of the material in relation to the area to be heated but can usually be remedied by proper design of the heating unit.

The present invention is mainly concerned with, but not necessarily limited, to a gradient induction heating process and apparatus for magnetic steel bars or billets in an induction heating unit as a preliminary to a hot working operation—in this specific instance hot taper rolling the steel bar to produce a tapered spring leaf. In order to produce a satisfactory tapered spring leaf by hot rolling the bar or billet has to be heated in such a way as to provide an increase in temperature from its midsection, which receives the least amount of hot working, towards its ends. Uniform heating of the portions of successive steel bars or billets to be hot worked is of great importance in producing uniform products in the subsequent forming operation. It is very important for this purpose to prevent or reduce power impairment during the heating cycle and eliminate time delay due to circuit cut-off and necessary transformer tap change. To enhance economical production and eliminate objectionable variations between successive similar work pieces, the induction heating unit is preferably automatic as far as feasible and operable without power input interruption to eliminate variations in the heated article or errors due to the operator to produce heated work pieces closely duplicating each other.

With the above objects in mind the present invention provides in combination with an induction heater an automatic tap changing power input transformer unit operable without power input interruption to assure proper power input to the induction heater throughout the heating cycle up to and beyond the Curie temperature of the work piece.

While automatic transformers to maintain voltage or frequency have been known heretofore, it is an important novel feature of the present invention to incorporate such device in an induction heating unit in such a manner as to prevent power reduction and time delay by automatically and periodically switching transformer contacts or taps during the heating cycle and thereby make feasible the multiple tap changes required, especially during the period preceding the reaching of the Curie temperature in the work piece, necessary to the maintenance of optimum power input during the entire heating cycle.

The primary object of this invention is to provide a new and improved induction heating apparatus and method for heating objects the electrical characteristics of which vary with their temperature by which the power absorption of the work piece is maintained at an optimum level throughout the entire heating cycle.

More specifically is an object of this invention to provide a new and improved induction heating apparatus and method for heating objects the electrical characteristics of which vary with temperature by which the rate of power absorption of the work piece can be maintained substantially constant throughout the heating cycle without the interruption of power input to the work piece.

More specifically is an object of this invention to provide a new and improved apparatus and method for induction heating of ferrous work pieces by which the power absorption of the work piece can be maintained substantially constant during the heating of the work pieces up to and beyond the Curie temperature of the work pieces.

It is a further important object of the present invention to provide, in an induction heating unit, an automatic tap switching power input transformer operative without power input interruption to obtain better power utilization during the heating cycle by voltage change in order to overcome or compensate for the increased impedance and other factor requiring an increased power input due to the increasing temperature in the workpiece.

Another object of the present invention is the provision in an induction heating unit, of an automatic transformer which may be triggered to automatically switch tap connections without power input interruption by means of an electronic work piece temperature sensing device or synchronous electric timing device. While for optimum control, the transformer switch is preferably effected under control of a device constantly sensing the work piece temperature, when the successive work pieces placed in the induction heater are for practical purposes identical, transformer switching in a predetermined timed sequence produces excellent results.

A further object of the present invention is to provide an automatic tap switching transformer unit for an induction heater to increase or decrease the voltage during the heating cycle, primarily before reaching the Curie temperature in the work piece to maintain a predetermined magnitude of power input to the induction heater and without interruption of the power input to the work piece.

Still another object of the present invention resides in the provision of means in induction heating units to produce heated articles of uniform character and predetermined physical properties at increased rate of speed.

Still a further object of the present invention is to provide automatic transformer tap changing means in an induction heating apparatus to maintain throughout the heating cycle, a high substantially uniform power input to the heating apparatus in order to facilitate and economize production of metal articles and duplicates thereof in uniform procession.

Another object of the present invention is to provide in an induction heater circuit the incorporation of an automatic transformer to compensate for power reduction caused by increase of reactive resistance due to heat accumulation in the work piece.

Still another object of the present invention is to provide in an induction heater an automatic transformer having a series of taps to be periodically switched under power to increase the current voltage in relative small steps and supplied to the inductor coil to prevent undue power reduction.

These and other more obvious objects and features will become evident by reference to the appended claims and as the following detailed description proceeds in connection with the accompanying drawings wherein:

FIGURE 1 a schematic circuit diagram of an induction heating unit embodying the principles of and operable in accord with the method of the present invention;

FIGURE 4 shows a second embodiment of the present invention employing additional choke coils;

FIGURE 5 is a third embodiment illustrating a modification of the FIGURE 4 structure;

FIGURE 6 shows a fourth simplified lower cost embodiment constituting a modification of the FIGURE 1 embodiment;

FIGURE 7 shows a further modification of the FIGURE 1 embodiment; and

FIGURE 8 illustrates a still further embodiment of the present invention in which tap changing of the transformer primary winding in the induction heating unit is automatically changed in response to temperature variations of the workpiece.

Although the present invention is illustrated and described in connection with inductively heating a steel bar or billet for a subsequent hot taper rolling operation, it will be understood that the improved induction heater and method may be used to heat ferrous metals possessing magnetic properties other than steel and which may take on a variety of other shapes than that shown and may be used for heating for other than subsequent hot working operations. For example, the improvements of the present invention may also be used in induction heating units used for hardening and subsequently quenching metal parts where found desired.

As preferred in the present embodiment, the work piece remains relatively stationary in the induction coil during the heating cycle. It would normally not be necessary to provide the automatic transformer of the present invention in a conventional continuous push-through induction heating unit such as is disclosed in United States Patent 2,852,650, issued September 16, 1958, to E. G. de Coriolis et al. for Induction Heating Apparatus and Method.

Figure 1:
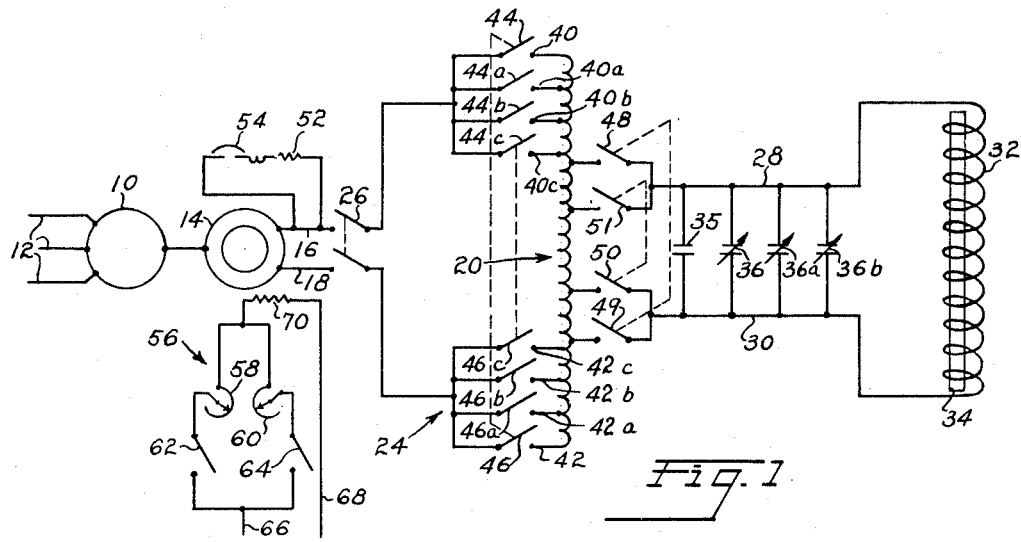

The induction heater circuit in FIGURE 1 comprises in general a three phase 60 cycle induction motor 10 which receives current from the three phase supply means 12 and the rotor of which is vertically (or horizontally, as the case may be) drive connected to the rotor of an integral generator 14. Generator 14 may, for instance, supply a fixed induction current at a potential of 800 volts and a frequency of up to ten kilocycles. In a preferred installation of this particular unit the frequency could range from 60 cycles, which would be directly connected to the induction motor circuit, up to ten kilocycles by the use of a motor generator. Higher frequencies of up to several hundreds of kilocycles may be used in other applications by employing, for instance, an electronic oscillator instead of the motor generator in accord with conventional practice.

The output leads 16 and 18 of the generator 14 are indirectly connected to an auto-transformer 20 through dual banks of switches or contacts 22 and 24 respectively. A main disconnect switch 26 may be interposed between the generator 14 and the transformer primary input circuit to cut-off the power supply to the transformer and induction coil but will not always be necessary as will be made evident.

The output branches 28 and 30 respectively of the auto-transformer 20 are connected to the winding of an induction coil 32 which may receive a metallic work piece 34—in this instance, a length of steel bar or billet—to be heated to a hot working temperature.

A desirable number of variable condensers or capacitors 36, 36a and 36b—three of which are shown in this instance—are connected across the auto-transformer output branches 28 and 30 for the normal power factor correction. An additional fixed capacitor 38 is also connected parallel with capacitors 36 across the auto-transformer output branches 28 and 30 which is selected to provide a minimum fixed capacity for a given heating operation or a specific work piece.

The auto-transformer 20 is provided at its input side with a series of taps 40, 40a, 40b, 40c and 42, 42a, 42b, 42c which may be selectively contacted by a like number of contacts or switches 44, 44a, 44b, 44c and 46, 46a, 46b, 46c. It will be noted that the switches or contacts 44 and 46, 44a and 46a, 44b and 46b, and 44c and 46c are ganged in pairs as indicated by both outer and inner switches in this specific arrangement.

Figure 2:
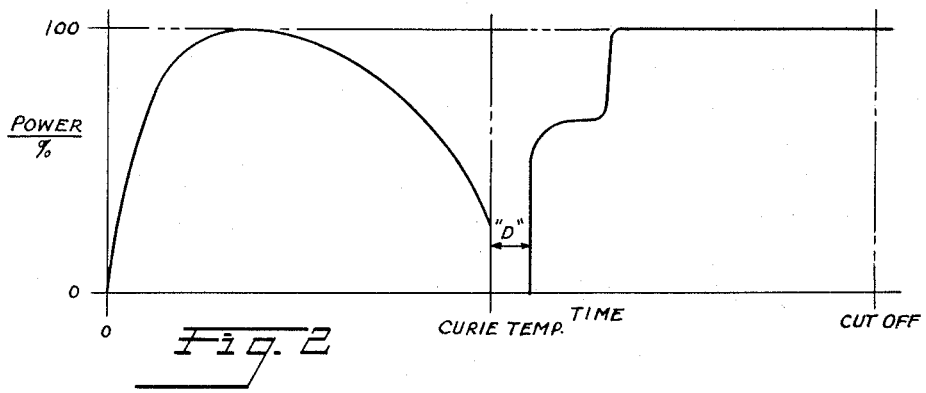
FIGURE 2 is a work piece power input vs. time diagram of a conventional induction heater performance curve.

By switching the tap connections along the auto-transformer coil 20, the voltage induced in the inductor circuit can be selectively adjusted to meet heating requirements without interruption of the power input to coil 32. It is well known in the operation of induction heating units that the impedance or reactive resistance in the unit increases with the temperature of the heat in the work piece and thereby consequently reducing the power that may be available at a fixed voltage. This undesirable effect may be of not too great importance in induction surface hardening processes where it may suffice to install properly designed power factor correction means in the form of adjustable capacitors, but in through heating processes as a preliminary to hot working operations this effect becomes more significant particularly when the work piece is to be heated to or beyond its Curie temperature; that is, the temperature at which the material of the work piece loses its magnetic property. This extreme power reduction is shown in the schematic power curve diagram in FIGURE 2 which is of a conventionally operated induction heater. It will be seen from this diagram that the power curve of the electric current tapers off as the temperature in the work piece approaches the Curie point. At or near the Curie point the circuit in conventional units would normally be disconnected by operating the main disconnect switch ( in the present embodiment illustrated at 26) to bleed off the capacity of the circuit through resistance after which properly installed transformer taps could be switched to induce additional voltage into the circuit. Since the main disconnect switch remains out a sufficient length of time to perform the above transformer tap change it necessarily results in an undesirable time delay—indicated in the diagram at "D." Such a time delay is also present in relay operated tap changing devices as shown in the aforesaid Mittelmann patents. This time delay is detrimental to modern production practice and makes multiple transformer tap changes impractical.

Figure 3:
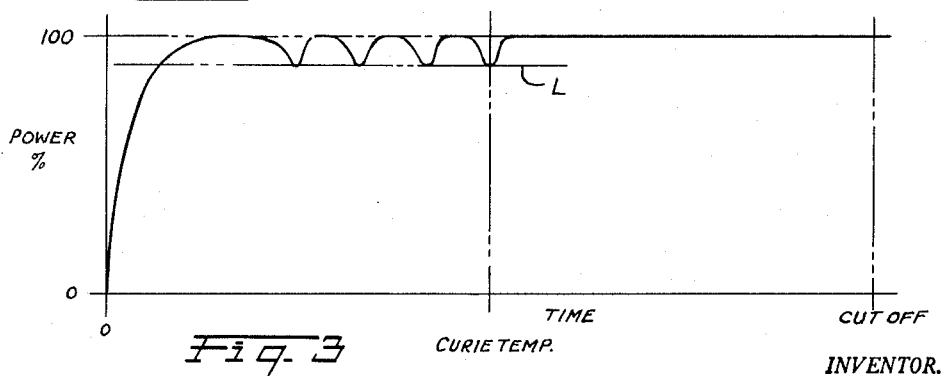
FIGURE 3 is a work piece power input vs. time diagram of an induction heater embodying the principles of and operated in accord with the method of the present invention showing the resultant improved performance curve.

The main feature of the present invention provides that the transformer taps 40 and 42 and switches 44 and 46 may be automatically and periodically changed at certain intervals to continuously increase the voltage in the inductor circuit in relatively small steps during the heating cycle, particularly during the period preceding reaching the Curie temperature in the work piece, to compensate for power reduction and to obtain full utilization of the available power at a fixed voltage rate without any undue time delay and power input interruption. The novel improvement of the present invention is illustrated in the schematic diagram of FIGURE 3 and by comparison it will be obvious that a distinct advantage has been achieved in that the improved power curve of FIGURE 3 assumes a wave like formation at or near the maximum power utilization. Every so often as the power decreases below a certain limit as indicated at "L" or at certain predetermined time intervals, the taps on the auto-transformer are automatically changed without power interruption to increase the voltage periodically as illustrated in the diagram of FIGURE 3. It will be obvious that it is also possible to reduce the voltage instead of increasing where necessary.

The automatic switching of the transformer taps can be accomplished in many various ways not illustrated here, as for instance, by an electronic switching tube, electronic temperature sensing device, synchronous electric time clock, and other devices well known in the industry which can easily be built into the circuit and need not further to be described.

The device operates in the following manner:

With the main disconnect switch 26 closed and switches 44a, b and c and 46a, b and c open, the switches 44 and 46 are closed to start the heating cycle. After a predetermined time or after the work piece reaches a certain temperature switches 44a and 46a are closed and switches 44 and 46 may be thereafter opened or left closed. At the same or other predetermined interval, switches 44b and 46b are closed and switches 44a and 46a may be thereafter opened or left closed. This sequence will be repeated for as many times as there are switches and tap connections on the auto-transformer which, of course, may vary depending on the type of application. In each instance closure of the next switch is effected before the existing connection is opened so that no power input interruption results.

In addition to the primary variable contacts 40, 42, 44, and 46 at the input end of the auto-transformer 20, secondary transformer contacts 48, 49, 50 and 51 may be provided at the output end or secondary of the transformer to further increase the voltage range in the event of certain heating operations not commonly encountered and which may be either automatic or manually switched. Switches 50 and 51 are normally closed and remain closed but if a further voltage range is required, switches 48 and 49 may be closed and switches 50 and 51 thereafter opened.

The amount of voltage increase each time a contact on the auto-transformer is switched can be changed according to operating conditions by changing the positions of the contacts or taps on the transformer.

If it is found necessary in certain installations, in order to prevent current surge during transformer tap changing, a surge dampener or time delay device 52 may be provided and connected at one end to the generator output lead 16 and at the other end to an overload circuit breaker 54 to prevent the overload device 54 from actuating on an overload current of short duration which may occur during tap switching.

An alternate method of preventing or limiting current surge is to incorporate a reduced direct current voltage field 56 for the generator 14 comprising a normal voltage rheostat 58 and rheostat 60 which are connected through automatic switches 62 and 64 to main supply line 66 and at the other end through a common resistor 70 to the main supply line 68. The switch 62 in this instance would be normally closed and switch 64 would be open. Just prior to any transformer contact closing or tap changing switch 62 is opened and switch 64 is closed to allow the reduced voltage field current to pass through rheostat 60 in order to dampen the surge current. In place of the rheostat 58 a fixed resistance (not shown) may be used, if preferred. The position of the switches 62 and 64 are reversed, that is restored to their normal positions, as soon as the current surge is reduced to normal. This cycle is repeated as many times as transformer contacts are switched. The operation of switches 62 and 64 can be made automatic in timed relation to the operation of the tap changing switches by conventional relay control circuitry.

A modified reduced voltage field circuit 72 is illustrated in the embodiments of FIGURES 4 to 6 consisting of a normal voltage rheostat 74 connected in series to another rheostat 76 which can be bypassed by a switch connection 78. Switch 78 is normally closed to supply a normal voltage field current but is opened automatically under current surge to add the resistance of reostat 76 in series to the circuit. Here again, rheostat 76 may be replaced by a fixed resistor (not shown), if desirable. This modified rheostat circuit arrangement eliminates any possibility of disconnecting the power supply.

FIGURE 6 illustrates a simplified lower cost modification of the FIGURE 1 tap switching circuit in which one bank of switches or contacts has been omitted. Although, the transformer 20 would not be kept balanced in this form, the transformer can be designed to overcome this handicap. This circuit operates as follows:

After closing suitable secondary switches 50 and 51 and main switch 26, if used, the cycle is ready to start. First switch or contact 46 is closed. After a predetermined time, switch 46a is closed and switch 46 may be thereafter opened or left closed, depending on the conditions. After additional predetermined time switch 46b is closed and switch 46a may thereafter also be opened or left closed. Again after an additional predetermined time, switch 46c is closed and switch 46b may thereafter also be left open or closed. Any practical or desirable number of switches or contacts may be employed and the above switch sequence will be repeated as many times as there are contacts in the circuit.

In the before described embodiments of FIGURES 1 and 6 it is assumed that the impedance in the temporarily short circuited transformer windings during switching is sufficient to reduce any circulating currents to a value in which $I^2R$ losses may be tolerable and in which the switches or contactors 44, 44a, 44b, 44c, 46, 46a, 46b, 46c are of reasonable size to be able to interrupt the short circuited windings. In other cases where this condition is not present to prevent or reduce circulating currents additional current limiting devices or a combination of current limiting devices and switches or contacts may be incorporated as shown in the embodiments of FIGURES 4 and 5.

As previously stated, the end transformer windings of transformer 20 are theoretically temporarily short circuited when two or more switches or contacts—as for instance, switches 44 and 44a or switches 46 and 46a—are closed at the same time. In cases where the impedance of the respective short-circuited transformer winding is not great enough to limit circulating currents to a level which may be safely broken with a reasonably sized switch or contactor, the incorporation of additional switches or contacts.

In FIGURE 4 switches or contacts 44, 44a, 44b, 44c, and 46, 46a, 46b, 46c are connected in pairs to reactances in the form of choke coils 80, 82, 84 and 86 between the generator output branches 16 and 18 and transformer 20; that is, switches 44 and 44a are connected to choke coil 80, switches 44b and 44c, to choke coil 82; switches 46c and 46b to choke coil 84; and switches 46a and 46, to choke coil 86. The operation of this circuit is similar to the operation of the FIGURES 1 and 6 circuits and again any number of choke coils and switches may be used as found practical.

If the heating cycles are longer or the reactor losses are still greater it may be desirable to employ additional switches or contacts to connect the choke coils with the generator output branches as illustrated in FIGURE 5. In this embodiment the choke coil 80 is connected by means of switches 88, 88a and 88b to the branch 16, choke coil 82 by means of switches 90, 90a and 90b to branch 16, choke coil 84 by means of switches 92, 92a and 92b to branch 18 and choke coil 86 by means of switches 94, 94a and 94b also to branch 18. In operation: first choke coil switches 94 and 88 are closed, then transformer switches 44 and 46 are closed to start the cycle. After a predetermined time 88a and 94a are closed and 88 and 94 are thereafter opened. Then switches 44a and 46a are closed and 44 and 46 are thereafter opened. Then switches 88b and 94b are closed and 88a and 94a are thereafter opened. After additional predetermined time the switching sequence is as follows: switches 88a and 94a are again closed and switches 88b and 94b thereafter are opened. Then switches 90a and 92a are closed. Thereafter switches 44b and 46b are closed and switches 44a and 46a are thereafter opened as well as switches 88a and 94a. Then switches 90 and 92 are closed. The further sequence after additional predetermined time is as follows: switches 90a and 92a are closed and switches 90 and 92 are then opened. Then switches 44c and 46c are closed and switches 44b and 46b thereafter are opened. Thereafter switches 90b and 92b are closed and switches 90a and 92a are then opened again. This intermittent choke coil switching arrangement provides reduction or elimination of undesirable circulating currents in applications where the impedance in the short circuited transformer windings is not sufficient to hold the circulating current below a $I^2R$ loss value but maintains continuous power input to the transformer 20 and the induction heater coil 32. Again as many switches and choke coil arrangements may be incorporated as found desirable.

The circuits of FIGURES 4 and 5 may also be arranged in the simplified unbalanced transformer arrangement as illustrated in FIGURE 6.

It should be mentioned here that it falls within the scope of the invention to employ other well known means to limit circulating currents in the induction heater circuit as for instance, grid type tube electronic devices in place of the choke coils.

FIGURE 7 shows a preferred circuit for a particular application and operates in the following manner:

Lines 16 and 18 are connected to the movable contacts of any desirable number of relays 100, 100a, 100b, 100c, 100d, 100e, 100f and 100g within a relay panel 102. The fixed contacts of the relays 100, 100a, 100b, 100c, 100d, 100e, 100f, and 100g are connected to transformer switches or taps 40, 40a, 40b, 40c, 42, 42a, 42b, and 42c. The coils of the relays 100, 100a, 100b, 100c, 100d, 100e, 100f and 100g are grounded at one end and independently connected at their other ends to a timer mechanism 104 which receives currents from the line circuit 106 and which is preferably a manually set synchronous motor driven cycle type timer although other mechanisms such as a heat sensing device, a thermal couple or electronic switching tube may be employed instead. However, those are costly and less fool proof. In operation the main switch 26 is closed and the timer 104 is started to simultaneously energize relays 100c and 100g to close connections to auto-transformer taps 40 and 42. After a predetermined time, relays 100b and 100f are simultaneously energized by means of the timer 104 to close taps 40a and 42a. Slightly thereafter or almost simultaneously therewith, relays 100c and 100g are simultaneously de-energized and the connections to taps 40 and 42 are thereby opened and so on. Any number of relays and tap connections may be employed and the timers manually set to a desired switching cycle which frequency depends on the material size, the type of the work piece and the amount of heating required. Relay coil 108 is energized and de-energized by timer 104 to close and open the switch 78 in timed relation with the actuations of relays 100–100g to limit the surge current as explained above in reference to the previous embodiment.

In FIGURE 8, energization of relays 100, 100a, 100b, 100c, 100d, 100e, 100f, and 100g is shown to be controlled by a temperature sensing device 120. Device 120, as previously mentioned, may be of any suitable form and senses the temperature of workpiece 34 while it is being heated within the induction furnace heating coil 32 to cause energization and de-energization of relays 100, 100a, 100b, 100c, 100d, 100e, 100f, and 100g in the sequence described in connection with the embodiment of FIGURE 7. As a consequence, it is clear that the voltage in the circuit is automatically periodically increased in response to temperature increases of workpiece 34 while it is being heated. This compensates for the increased impedance resulting from increasing the temperature of the workpiece.

Thus, it has been provided an improved induction heating unit incorporating means to make full power utilization possible which is of primary importance in modern production practices in regard to saved time and to produce a uniformly heated workpiece.

Because of the incorporation of fully automatic transformer tap changing means, production can be facilitated and speeded up and assures uniformity of successive workpieces in any one production run.

The present improved induction heating unit with automatic transformer tap changing means is particularly applicable to heat workpieces as a preliminary to a following hot working operation where the metal is plastically to be deformed between dies or rolls.

By the present invention, the power source need not to be disconnected for the transformer tap switching to change the voltage as has been customary but, instead, the transformer taps are switched periodically and successively during the heating cycle to compensate for the increased impedance during such cycle and means in the form of intermittent choke coils or electronic grid type tubes are incorporated to limit or prevent excessive circulating currents during the periods in which the windings of the transformer are temporarily short circuited when necessary.

The present invention may be embodied in other specific forms without departing from the spirit and essential characteristic thereof, the present embodiments are, therefore, to be considered in all respects as illustrative only and not restrictive, the scope of the invention being indicated by the appended claims rather than by the foregoing description.

I claim:

1. In combination, an alternating current source, an induction heater adapted to receive an object to be heated, and a power transmission coupling interposed between said source and said heater comprising a multi-terminal auto-transformer having at least three primary terminals with a pre-selected number of coil turns between said terminals and at least a pair of secondary terminals connected to said heater to establish a load circuit, means for connecting said auto-transformer across said source including at least a pair of sequentially operable switching devices operable when closed to connect said source to a pair of said primary terminals whereby the number of transformer coil turns connected across said source is varied by a predetermined magnitude to control the voltage input in said load circuit, and selector means for actuating said switching devices and being operable, when one of said switching devices is in closed position, to close the other of said switching devices before said one of said switching devices is opened to enable the primary to secondary ratio of said transformer to be varied without interruption of power transmission from said source to said heater, said selector means comprising means responsive to the temperature of the object in said heater for automatically controlling the actuation of said switching devices for periodically varying the voltage input is accord with variations of the impedance of said object.

2. The combination defined in claim 1 wherein each of said switching devices comprises a pair of movable switch blades and a choke coil interposed between and connecting said blades to said source.

3. In combination, an alternating current generator having external field excitation and overload preventing means, an induction heater, and a power transmission coupling interposed between said generator and said heater comprising a multi-terminal auto-transformer having at least three primary terminals with a pre-selected number of coil turns between said terminals and at least a pair of secondary terminals connected to said heater to establish a load circuit, means for connecting said auto-transformer across said generator including at least a pair of sequentially operable switching devices operable when closed to connect said generator to a pair of said primary terminals whereby the number of transformer coil turns connected across said generator is varied by a predetermined magnitude to control the voltage input in said load circuit, and selector means for actuating said switching devices and being operable, when one of said switching devices is in closed position, to close the other of said switching devices before said one of said switching devices is open to enable the primary to secondary ratio of said transformer to be varied without interruption of power transmission from said generator to said heater, said overload preventing means including means for reducing the field excitation of said generator during selective variation of said transformer coil turns, said field excitation reducing means comprising a current source, first resistance means connected across said current source, second resistance means, and relay actuated switching means controlled by said selector means to disposed said second resistance means in series circuit relationship with said first resistance means in timed relation with the actuation of said switching devices to limit current surges through said external field excitation.

4. The combination defined in claim 3 comprising a relay for controlling the actuation of each of said switching devices and energizing means for said relay including a timer mechanism.

References Cited in the file of this patent

UNITED STATES PATENTS

| | | |
|---|---|---|
| 1,623,839 | Hundt | Apr. 5, 1927 |
| 1,804,614 | Hill | May 12, 1931 |
| 1,835,481 | Field | Dec. 8, 1931 |
| 1,981,631 | Northrup | Nov. 20, 1934 |
| 2,184,283 | Capita | Dec. 26, 1939 |
| 2,324,525 | Mittelmann | July 20, 1943 |
| 2,441,435 | Mittelmann | May 11, 1948 |
| 2,618,775 | Shay | Nov. 18, 1952 |
| 2,909,585 | Tudbury | Oct. 20, 1959 |